US010078597B2

United States Patent
Mohan

(10) Patent No.: US 10,078,597 B2
(45) Date of Patent: Sep. 18, 2018

(54) SYSTEM AND METHOD OF DISTINGUISHING SYSTEM MANAGEMENT MODE ENTRIES IN A TRANSLATION ADDRESS CACHE OF A PROCESSOR

(71) Applicant: VIA ALLIANCE SEMICONDUCTOR CO., LTD., Shanghai (CN)

(72) Inventor: Viswanath Mohan, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 20 days.

(21) Appl. No.: 14/678,600

(22) Filed: Apr. 3, 2015

(65) Prior Publication Data
US 2016/0292075 A1 Oct. 6, 2016

(51) Int. Cl.
*G06F 12/10* (2016.01)
*G06F 12/1036* (2016.01)

(52) U.S. Cl.
CPC ................. *G06F 12/1036* (2013.01)

(58) Field of Classification Search
CPC .. G06F 12/1027; G06F 1/3203; G06F 1/3206; G06F 13/24; G06F 1/3293; G06F 12/1036; G06F 12/10; G06F 2212/682; G06F 9/3842; G06F 9/4812; G06F 11/1441; G06F 12/1009; G06F 1/32; G06F 2212/681; G06F 2212/684; G06F 9/544; G06F 12/0292; G06F 21/6245; G06F 2212/683; G06F 2212/50; G06F 2212/651; G06F 12/0808; G06F 12/0891
See application file for complete search history.

(56) References Cited

U.S. PATENT DOCUMENTS

| 5,544,344 | A * | 8/1996 | Frame | ................. G06F 12/0842 711/144 |
| 5,954,812 | A * | 9/1999 | Shiell | ................. G06F 12/0802 711/145 |
| 7,552,255 | B1 * | 6/2009 | George | ............... G06F 12/1036 710/52 |
| 2004/0143720 | A1 * | 7/2004 | Mansell | .............. G06F 12/1491 711/206 |

(Continued)

*Primary Examiner* — David X Yi
*Assistant Examiner* — Candice Rankin
(74) *Attorney, Agent, or Firm* — McClure, Qualey & Rodack, LLP

(57) ABSTRACT

A processor including a memory that stores a system management mode (SMM) value indicative of whether the processor is in SMM, a translation address cache (TAC) that includes multiple entries for storing address translations, in which each entry includes an SMM identifier, hit logic that compares a lookup address with address translations stored in the TAC for determining a hit, in which the hit logic determines a hit only when a corresponding SMM identifier of an entry matches the SMM value, and entry logic that selects an entry of the TAC for storing a determined address translation and that programs an SMM identifier of the selected entry of the TAC to match the SMM value. The processor may include flush logic that distinguishes SMM entries, and processing logic that commands flushing upon entering and/or exiting SMM. Non-SMM entries may remain in the TAC when entering and exiting SMM.

24 Claims, 6 Drawing Sheets

(56) References Cited

U.S. PATENT DOCUMENTS

2004/0153672 A1* 8/2004 Watt .................. G06F 9/3012
 726/22
2015/0370302 A1* 12/2015 Mudusuru ............ G06F 1/30
 711/103

* cited by examiner

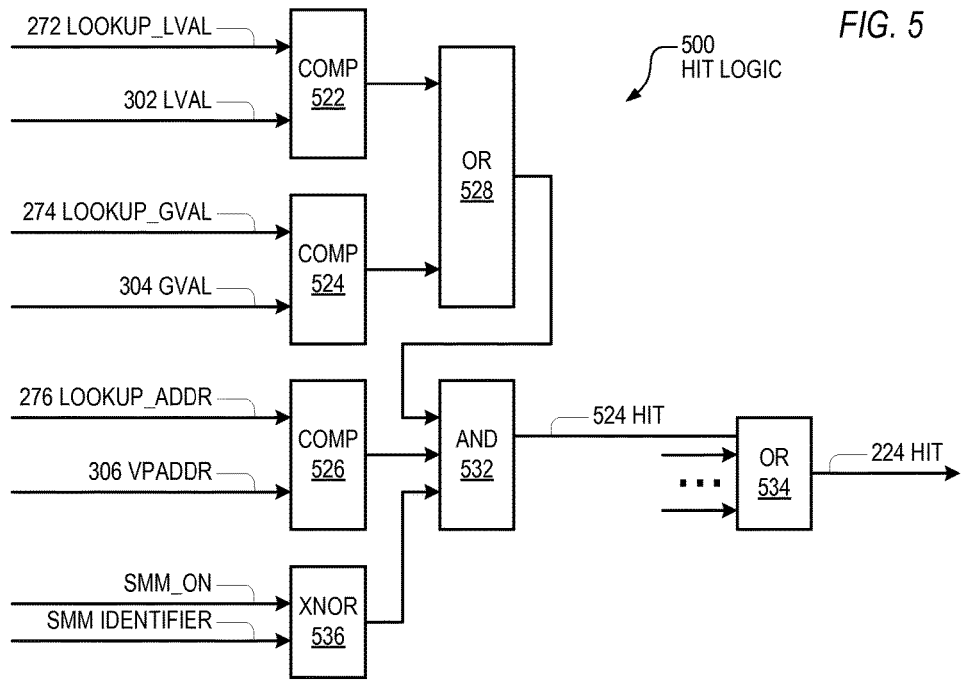
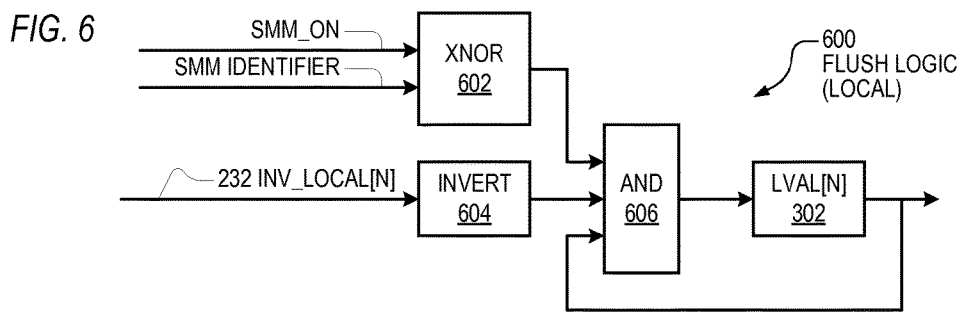
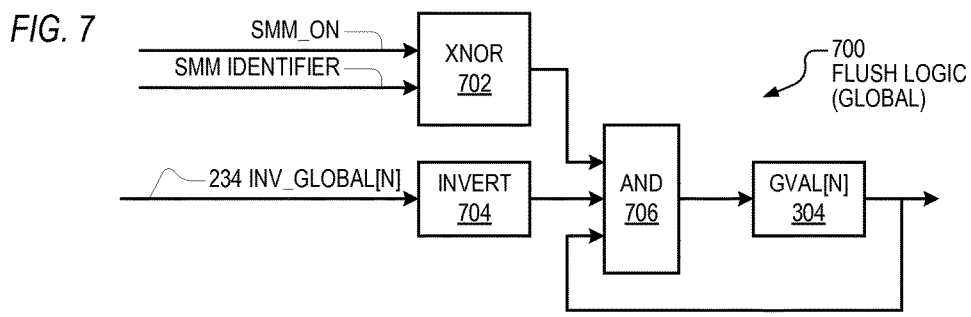

SYSTEM AND METHOD OF DISTINGUISHING SYSTEM MANAGEMENT MODE ENTRIES IN A TRANSLATION ADDRESS CACHE OF A PROCESSOR

BACKGROUND OF THE INVENTION

Field of the Invention

The present invention relates in general to entries in a translation address cache of a processor, and more particularly to a system and method of distinguishing system management mode (SMM) entries in the translation address cache for enabling maintenance of non-SMM entries when entering and/or exiting SMM.

Description of the Related Art

Modern processors support virtual memory capability. A virtual memory system maps, or translates, virtual addresses used by a program to physical addresses used by hardware to address memory. Virtual memory has the advantages of hiding the fragmentation of physical memory from the program, facilitating program relocation, and of allowing the program to see a larger memory address space than the actual physical memory available to it. These advantages are particularly beneficial in modern systems that support time-sharing of the processor by multiple programs or processes.

The operating system creates and maintains in memory translation tables, often referred to as page tables in a paged virtual memory system, that map virtual addresses to physical addresses. The translation tables may be in the form of a hierarchy of tables, some of which map virtual addresses to intermediate table addresses. When a program accesses memory using a virtual address, the translation tables are accessed to accomplish the translation of the virtual address to its physical address, commonly referred to as a page table walk, or "tablewalk." The additional memory accesses to access the translation tables can significantly delay the ultimate access to the memory to obtain the data or instruction desired by the program.

Modern processors include one or more translation address caches to improve performance by addressing the memory access and delay issues. The translation address caches may include a translation-lookaside buffer (TLB). A TLB is a hardware structure of a processor that caches the virtual to physical address translations in order to greatly reduce the likelihood of the need for tablewalks. The virtual address to be translated is compared to previously stored virtual addresses in the TLB and if the virtual address hits in the TLB (e.g., when a virtual address match is found), the TLB provides the physical address. Retrieving the physical address from the TLB consumes much less time than would be required to access the translation tables in memory to perform the tablewalk. The efficiency (hit rate) of TLBs is crucial to processor performance.

The translation address caches may also include a paging structure cache that caches information for one or more of the page tables. For example, some paging modes may use a level 4 page map table (PML4), a page directory pointer table (PDPT), a page directory (PD), and a page table (PT), in which a paging cache may be provided for one or more of these page tables. The paging structure cache incorporates any one or more of these paging caches. In this manner, even if there is a miss in the TLB, the tablewalk process may be significantly accelerated if the requested address translation is cached within the paging structure cache.

Modern processors and processing systems support a system management mode (SMM) in which normal processing is interrupted and suspended. SMM operation is entered in response to an external stimulus, such as an SMM interrupt (SMI). SMM operation is usually temporary in which normal processing may be resumed at the point in which normal processing was interrupted. SMM is particularly advantageous for entering any one or more low power modes to conserve power. The processor enters the SMM in response to the assertion of an SMM interrupt. Prior to entering SMM, the processor microcode saves the state of the processor in an SMM save area and puts the processor into a known state. The known state may be considered an isolated operating mode in order to perform one or more valuable functions separate from normal operating mode, such as performing power saving functions or the like. When it is desired to return to the normal operating mode, a resume (RSM) instruction is executed to exit SMM. In the process of exiting SMM, the microcode restores the saved state from the SMM save area and takes the processor back to the operating mode that existed prior to the SMI.

In the conventional configuration, most, if not all of the cached address translations are flushed as the processor enters and/or exits SMM. The flushing of the cached information was performed to ensure proper operation when normal operation is resumed since SMM is considered a separate operating mode using a different address space. A hit within a translation address cache (e.g., TLB or paging structure cache) during normal mode with an SMM entry causes a false hit, which in turn may result in improper operation or even system failure.

SUMMARY OF THE INVENTION

A processor according to one embodiment includes a memory, a translation address cache, hit logic, and entry logic. The memory stores a system management mode value indicative of whether the processor is in a system management mode. The translation address cache includes multiple entries for storing address translations, in which each entry includes a system management mode identifier. The hit logic compares a lookup address with address translations stored in the translation address cache for determining a hit, in which the hit logic determines a hit only when a corresponding system management mode identifier of an entry matches the system management mode value. The entry logic selects an entry of the translation address cache for storing a determined address translation and programs a system management mode identifier of the selected entry of the translation address cache to match the system management mode value.

The processor may include processing logic that commands flushing of address translations stored in the translation address cache having a corresponding system management mode identifier indicating the system management mode in response to entering the system management mode. The processor may include processing logic that commands flushing of address translations stored in the translation address cache having a corresponding system management mode identifier indicating the system management mode in response to exiting the system management mode. Flushing may be commanded for both entering and exiting the system management mode.

The processor may include flush logic that flushes only those address translations stored in the translation address cache that have a corresponding system management mode identifier matching the system management mode value in response to a flush command. The processor may include processing logic that sets the system management mode value to indicate the system management mode in response to a system management mode interrupt, and then that issues the flush command. The processor may include processing logic that issues the flush command in response to exiting the system management mode, and then that clears the system management mode value. The processing logic may issue the flush command for both entering and exiting the system management mode. The translation address cache may be a translation-lookaside buffer, or a paging structure cache, or any combination thereof.

A method capable of operating a processor to distinguish system management mode entries in a translation address cache includes storing a system management mode value indicative of whether the processor is in the system management mode, providing a system management mode identifier for each of multiple entries of the translation address cache for storing address translations, determining a hit in the translation address cache only when a corresponding system management mode identifier of an entry matches the system management mode value when applying a lookup address to the translation address cache to find a matching address, and programming the system management mode identifier of a selected entry of the translation address cache to match the system management mode value in the event of a miss in the translation address cache, and storing a determined address translation in the selected entry.

A computer program product encoded in at least one non-transitory computer usable medium for use with a computing device according to one embodiment includes computer usable program code embodied in the medium for specifying a processor. The computer usable program code may include first program code for specifying a memory that stores a system management mode value indicative of whether the processor is in a system management mode, second program code for specifying a translation address cache comprising multiple entries for storing address translations, in which each entry includes a system management mode identifier, third program code for specifying hit logic that compares a lookup address with address translations stored in the entries of the translation address cache for determining a hit, in which the hit logic determines a hit only when a corresponding system management mode identifier of an entry matches the system management mode value, and fourth program code for specifying entry logic that selects one entry of the translation address cache for storing a determined address translation and that programs a system management mode identifier of the selected entry of the translation address cache to match the system management mode value.

BRIEF DESCRIPTION OF THE DRAWINGS

FIG. 5 is a block diagram illustrating hit logic implemented according to one embodiment within the TAC of FIG. 2 for determining whether a hit occurred in response to an address lookup.

FIG. 6 is a block diagram illustrating flush logic used to invalidate a bit of the LVAL bit vector of an entry of the TLB of FIG. 2 according to one embodiment, which applies in similar manner to the PSC of FIG. 2.

FIG. 7 is a block diagram illustrating flush logic used to invalidate a bit of the GVAL bit vector of an entry of the TLB of FIG. 2 according to one embodiment.

DETAILED DESCRIPTION

Figure 1:
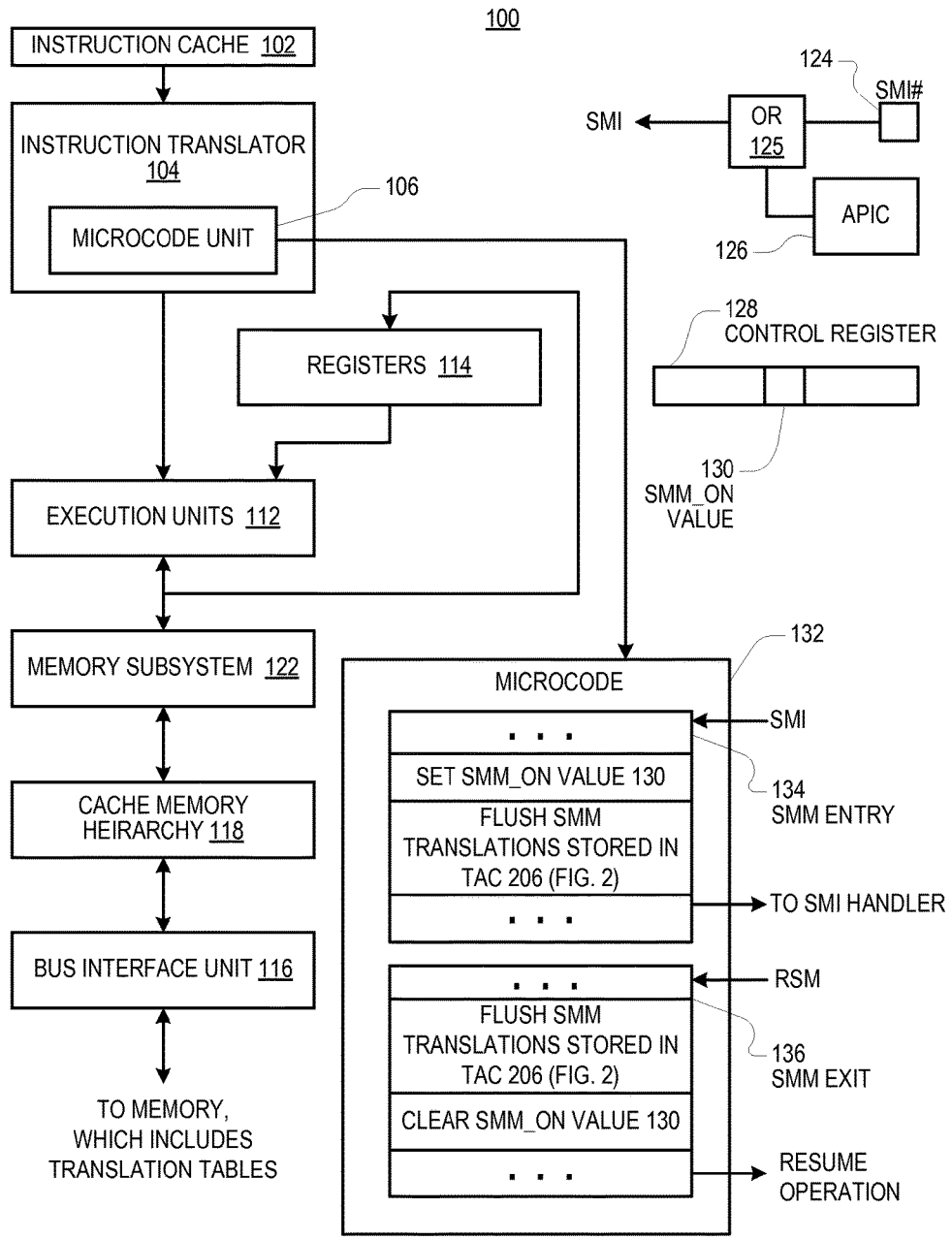
FIG. 1 is a block diagram of a processor implemented according to one embodiment of the present invention having a system management mode (SMM) and configured to maintain address translations when entering and exiting SMM.

Various well-known instruction set architecture (ISAs) include features designed to improve translation address cache efficiency. For example, the x86 ISA includes support for process context identifiers (PCIDs), virtual processor identifiers (VPIDs) and extended page table pointers (EPTPs). The x86 ISA also includes instructions that instruct the processor to invalidate cached translation entries associated with a given PCID, VPID and/or EPTP. The present invention is described herein for a processor that supports a large number of different address spaces and that uses efficient address translation caching. The processor described herein also uses an address translation cache that supports simultaneous invalidation of common context entries. For example, embodiments are described in which the large space is mapped to a much smaller non-architectural space, which advantageously enables the cached translation entries to include far fewer bits. Embodiments are described herein that advantageously enable the processor to simultaneously invalidate all cached translation entries associated with the address translation context being unmapped. Advantageously, embodiments take into account the nature of local and global address translations and support efficiencies for invalidating cached translation entries of the two types. The present invention is contemplated for processors with or without address space mapping and simultaneous cache invalidation functions.

As used herein, an address translation context is a set of information that enables the translation of memory addresses from a first memory address space to a second memory address space. An example of an address translation context in the x86 instruction set architecture (ISA) may be the set of information included in the CR3 register (and other control registers, e.g., CR0 and CR4 and related model specific registers (MSR)), page tables, page directories, page-directory-pointer tables, PML4 tables, extended page table pointers (EPTP), and/or extended page tables (EPTs) that enable translation of linear addresses to physical memory addresses. In the case of the x86 ISA, the translation is performed by hardware within the processor. However, in other ISAs (e.g., MIPS, SPARC), the operating system may perform the translation. Another example of an address translation context in the ARM ISA may be the set of information included in the translation table base register (TTBR) (and other control registers, e.g., translation control register (TCR), system control register (SCTLR) and Hyp configuration register (HCR)) and/or translation tables.

Also as used herein, an address translation is a pair of memory addresses in which a first of the pair is the address to be translated and the second of the pair is the translated address. A local address translation is an address translation in which a single address translation context is used to translate the address to be translated into the translated address. A global address translation is an address translation in which multiple address translation contexts are used to translate the address to be translated into the translated address. A local memory page, or local page, is a memory page that has a local address translation. A global memory page, or global page, is a memory page that has a global address translation.

A processor as described herein supports multiple operating modes including an alternative operating environment mode referred to herein as the system management mode (SMM). Address translations determined during operation outside of SMM may be stored in a translation address cache, such as the TLB or the paging structure cache (non-SMM entries). As used herein, the translation address cache includes either one or both of the TLB and the paging structure cache. The processor may be placed into SMM for various reasons, such as including, but not limited to, any one or more power saving modes. Many valuable non-SMM entries stored in the translation address cache otherwise remain valid after exiting SMM. Conventionally, such entries were flushed or otherwise invalidated. Advantageously, the present invention avoids flushing of the non-SMM entries while entering and exiting SMM. As described for embodiments herein, an SMM identifier is added to each translation cache entry to distinguish between SMM and non-SMM translation entries. The processor also stores a programmable SMM ON value that identifies the current operating mode of the processor, including SMM or non-SMM. The SMM ON value is used to set the SMM identifier for each new translation entry. Hit logic uses the SMM ON value compared with each SMM identifier to avoid false hits. Flush logic also uses the SMM ON value compared with each SMM identifier bit to flush only those values that correspond with the applicable mode to thus avoid flushing valid entries in the other mode.

FIG. 1 is a block diagram of a processor 100 implemented according to one embodiment of the present invention having a system management mode (SMM) and configured to maintain address translations when entering and exiting SMM. The processor 100 includes an instruction cache 102, an instruction translator 104 that includes a microcode unit 106, execution units 112, architectural registers 114, a memory subsystem 122, a cache memory hierarchy 118 and a bus interface unit 116. Other functional units (not shown) may include a tablewalk engine, which performs translation tablewalks to generate virtual to physical address translations; branch predictors; a reorder unit; a reorder buffer; reservations stations; an instruction scheduler; and data prefetch units, among others. In one embodiment, the microprocessor 100 has an out-of-order execution microarchitecture in that instructions may be issued for execution out of program order. In one embodiment, the microprocessor 100 has a superscalar microarchitecture in that it is capable of issuing multiple instructions per clock cycle to the execution units 112 for execution. In one embodiment, the microprocessor 100 conforms substantially to the x86 ISA, however, other ISAs are contemplated.

The instruction cache 102 caches architectural instructions fetched from system memory with which the bus interface unit 116 communicates. In one embodiment, a translation-lookaside buffer (TLB) (e.g., TLB 207, FIG. 2) is associated with the instruction cache 102 that caches address translations for instructions. The TLB 207 is one example of a translation address cache (TAC) 206, which may also include one or more paging cache structures. In one embodiment, the instruction translator 104 translates the architectural instructions fetched from the instruction cache 102 into microinstructions of a microinstruction set of the microarchitecture of the microprocessor 100. The execution units 112 execute the microinstructions. The microinstructions into which an architectural instruction is translated implement the architectural instruction.

The execution unit 112 receives source operands from the architectural registers 114 (or perhaps from the reorder buffer or a forwarding bus). Operands are loaded into the registers 114 from memory via the memory subsystem 122. The memory subsystem 122 writes data to and reads data from the cache memory hierarchy 118 (e.g., level-1 data cache, level-2 cache, level-3 cache). In one embodiment, each cache memory has an associated TLB, such as TLB 207 of FIG. 2. If a cache miss occurs to the last level cache of the cache hierarchy 118, the data or instruction cache line is requested from the bus interface unit 116, which fetches the cache line from system memory.

The memory subsystem 122 (e.g., tablewalk engine) also accesses translation tables (referred to as paging structures in the x86 ISA, for example) in system memory to perform page tablewalks to generate virtual to physical address translations, which are subsequently loaded into the TLBs of the processor 100, such as TLB 207 of FIG. 2, as described below in more detail with respect to FIG. 4. The translation tables may include tables that map a page (e.g., x86 ISA page tables) or that reference other translation tables (e.g., x86 ISA page directories, page-directory-pointer tables, PML4 tables) in a translation table hierarchy. The translation tables may also include tables that map virtualized physical addresses (the virtualized physical addresses are referred to as guest physical addresses and the translation tables are referred to as extended page tables (EPT) in the x86 ISA, for example) to true physical addresses (referred to as host physical addresses in the x86 ISA, for example). In one embodiment, a paging structure cache (PSC) (e.g., PSC 209, FIG. 2) is included that caches information for one or more of the page tables. The PSC 209 is another example of the TAC 206. In general, the TAC 206 includes the TLB 207, the PSC 209, or both.

The processor 100 may include an SMM interrupt (SMI) pin SMI#124 that enables external assertion of an SMM interrupt (SMI) to place the processor 100 into the alternative operating environment mode referred to as SMM. In addition, or in the alternative, the processor 100 may include an advanced programmable interrupt controller (APIC) 126 that also enables external assertion of the SMI via an SMI message or the like. A Boolean OR function 125 receives an SMM interrupt via the SMI# pin 124 or the APIC 126 and asserts SMI. The architectural registers 114 of processor 100 include various control registers, including a state control register 128 that stores an SMM_ON value 130 indicative of the SMM of operation. In one embodiment, the SMM_ON value 130 includes at least one bit having a first state (e.g., logic "1") indicative of the processor 100 operating in SMM, and having a second state (e.g., logic "0") indicative of the processor 100 not operating in SMM (non-SMM), such as a normal operating mode or the like.

The microcode unit 106 may include a microcode memory (e.g., read-only memory or ROM) configured to store microcode 132, which may include microcode routines, and a microsequencer (not shown) for fetching from the microcode memory instructions of the microcode 132. In one embodiment, the microcode instructions are microinstructions; in one embodiment the microcode instructions are translated into microinstructions. The microcode 132 implements some of the architectural instructions, such as particularly complex architectural instructions. The microcode 132 includes microcode routines or the like for performing various functions of the processor 100.

In the illustrated embodiment, the microcode 132 include an SMM entry routine 134 responsive to an SMI for entering SMM, and an SMM exit routine 136 responsive to a resume instruction RSM of an SMI handler program. In response to an SMM interrupt SMI, the SMM entry routine 134 is executed to perform various housekeeping tasks and then to transfer control to the SMI handler program. As an example, when the processor 100 receives an SMI, the SMM entry routine 134 waits for current instructions to retire and for stores to complete. The SMM entry routine 134 then saves the current context of the processor 100 in a save state map area within in an SMRAM or the like (not shown) located at a predetermined or programmable SM base address stored in an SM base register (not shown). The housekeeping functions of the SMM entry routine 134 include setting the SMM_ON value 130 in the state control register 128 to indicate that the processor is operating in the SMM (e.g., setting an SMM_ON bit true or to logic "1"). After the current context of the processor 100 is saved, the SMM entry routine 134 eventually transfers control to the SMI handler program, which may also be located within the SMRAM.

The SMI handler program performs the various functions of SMM. For example, the SMI handler program may perform power saving functions for placing the processor 100 into any one of one or more low power modes. When the SMI handler program detects that it is desired to exit SMM and return to the normal operating mode (non-SMM), it executes the RSM instruction to transfer control to the SMM exit routine 136 which performs various housekeeping tasks to return operation of the processor 100 back to the point of the SMI in order to resume operations. As an example, the current context of the processor 100 in the save state map area of the SMRAM is restored. The SMM exit routine 136 also clears the SMM_ON value to indicate the non-SMM operating mode (e.g., resetting an SMM_ON bit false or to logic "0"). Operation is then returned to the operating point at which the SMI occurred to resume operations.

When entering SMM according to one embodiment, the SMM entry routine 134 further places the processor 100 into a isolated operating mode or state and changes the context to a "real" mode. The SMI handler program may re-enable a protected mode and paging to a different address translation context. Furthermore, the SMM entry routine 134 may execute an instruction to change the SM base address. Upon RSM, the SMM exit routine 136 changes the contents of the SM base register with the updated value. Upon assertion of the next SMI, operation may be transferred to a different SMI handler program at a different SMRAM location. In this manner, the SMM operation may not operate in a uniform or consistent address translation context from one SMM session to the next. Thus, address translations stored in the TLB 207 during one SMM session may not be valid for the next SMM session.

In conventional configurations, most or all of the entries stored in the TAC 206 (including the TLB 207 and/or the PSC 209) were flushed or otherwise invalidated. The flushing of the TAC 206 was performed to ensure proper operation when normal operation was resumed since SMM is considered a separate operating mode in a different address space. In this manner, many valuable translations that were stored in the TAC 206 prior to the SMM interrupt were lost. When operation was resumed, each new address lookup required performing a new and time-consuming tablewalk to determine the corresponding address translation. The effectiveness and efficiency of the TAC 206 (including either or both the TLB 207 and the PSC 209), therefore, was temporarily lost. The present innovation avoids the flushing or invalidation of many if not all of these valuable translations.

As shown within the SMM entry routine 134, after the SMM_ON value 130 is set to indicate SMM, only the translations stored in the TAC 206 that are associated with SMM (SMM translations) are flushed or otherwise invalidated. In this manner, all of the translations of the TAC 206 that were determined and entered outside of SMM remain within the TAC 206. The processor 100 may generate and add SMM translations in the TAC 206 that are associated with SMM. This may, of course, displace some of the non-SMM translations that were determined and entered outside of SMM. It is envisioned, however, that many of the valuable non-SMM translations remain stored within the TAC 206. It is appreciated that SMM and non-SMM translations coexist within the TAC 206.

As shown within the SMM exit routine 136, before the SMM_ON value 130 is cleared to indicate non-SMM, only the SMM translations stored in the TAC 206 that are associated with SMM are flushed or otherwise invalidated. As noted above, the processor 100 may generate and add SMM translations in the TAC 206 that are associated with SMM, which displace some of the translations that were determined and entered outside of SMM. Again, however, the number of SMM translations is typically significantly smaller than the total number of entries of the TAC 206, so that many of the valuable non-SMM translations remain stored within the TAC 206.

In one embodiment, it may be possible to avoid flushing any translations of the TAC 206, including the SMM-only translations, upon entering or exiting SMM. In this case, it is assumed that upon entering SMM, when the SMM handler code enables paging, the SMM translations determined in previous SMM sessions are flushed from the TAC 206.

In one embodiment, the SMM translations are only flushed upon entering SMM as shown performed by the SMM entry routine 134. In this embodiment, the SMM translations are not flushed upon exiting SMM. In another embodiment, the SMM translations are only flushed upon exiting SMM as shown performed by the SMM exit routine 136. In this embodiment, the SMM translations are not flushed upon entering SMM. In yet another embodiment, the SMM translations are flushed both upon entering SMM as shown performed by the SMM entry routine 134 and upon exiting SMM as shown performed by the SMM exit routine 136.

Figure 2:
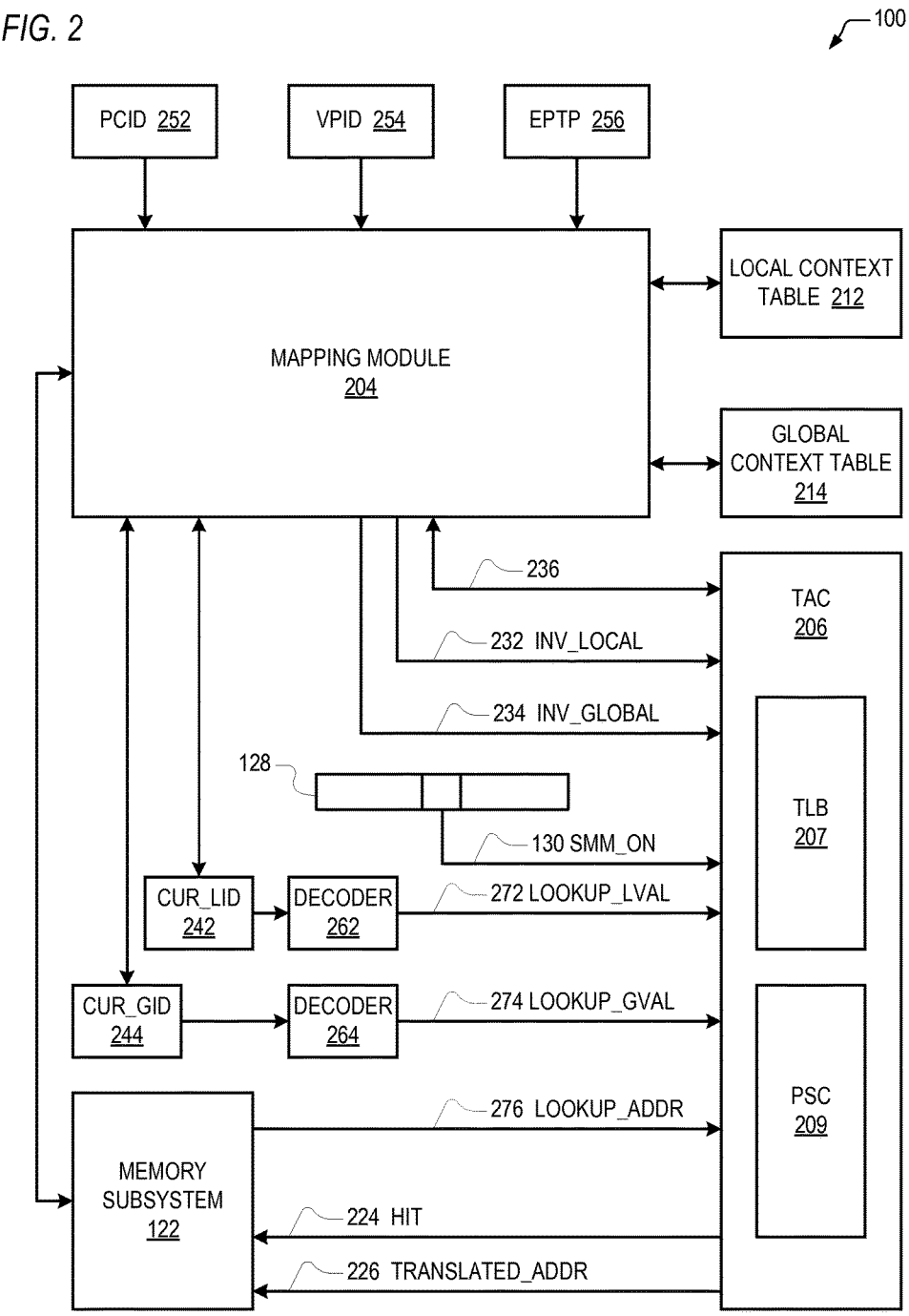
FIG. 2 is a block diagram illustrating portions of the processor of FIG. 1 in more detail including a translation address cache (TAC).

FIG. 2 is a block diagram illustrating portions of the processor 100 of FIG. 1 in more detail. The processor 100 includes the TAC 206 (which includes the TLB 207 and the PSC 209), a mapping module 204 coupled to the TAC 206 via coupling 236, a memory subsystem 122 coupled to the TAC 206 and mapping module 204, a local context table 212 and a global context table 214 coupled to the mapping module 204. The mapping module 204 includes microcode, a hardware state machine, or a combination thereof. The mapping module 204 receives a PCID 252, a VPID 254, and an extended page table pointer EPTP 256. The mapping module 204 receives the PCID 252, VPID 254 and EPTP 256 in response to various events, such as instructions that change the current address translation context and/or invalidate an address translation context, some of which are described below. In response to receiving the PCID 252, VPID 254 and EPTP 256, the mapping module 204 may advantageously simultaneously invalidate multiple local address translations and/or multiple global address translations in the TAC 206 by generating an invalidate local (INV_LOCAL) bit vector 232 and/or an invalidate global (INV_GLOBAL) bit vector 234, respectively.

Additionally, in response to receiving the PCID 252, VPID 254 and EPTP 256, the mapping module 204 may update a current local context identifier (CUR_LID) 242 and/or current global context identifier (CUR_GID) 244. The CUR_LID 242 and CUR_GID 244 identify the current address translation context. Specifically, the CUR_LID 242 identifies local memory pages of the current address translation context, and the CUR_GID 244 identifies global memory pages of the current address translation context, as described in more detail below. In one embodiment, the CUR_LID 242 is an encoded value, and a decoder 262 decodes the CUR_LID 242 and provides a lookup local valid (LOOKUP_LVAL) decoded one-hot bit vector 272 (i.e., one bit is set and the others are clear) to the TAC 206; and the CUR_GID 244 is an encoded value, and a decoder 264 decodes the CUR_GID 244 and provides a lookup global valid (LOOKUP_GVAL) decoded one-hot bit vector 274 to the TLB 207. Other embodiments are contemplated for representing the CUR_LID 242 and CUR_GID 244. For example, they may themselves be stored in a decoded form and provided directly to the TAC 206 without the need for the decoders 262/264.

When the memory subsystem 122 performs a lookup of a virtual address of a memory page in the TAC 206, it provides the lookup address (LOOKUP_ADDR) 276 to the TAC 206. The LOOKUP_LVAL 272 and the LOOKUP_GVAL 274 are also provided to the TAC 206 and are included in the lookup. In addition, the SMM_ON value 130 from the state control register 128 is provided to the TAC 206 so that the comparison may take into account the SMM context. The TAC 206 indicates whether a hit occurred via a hit indicator 224 and, if so, provides a translated address (TRANSLATED_ADDR) 226 to the memory subsystem 122. This operation is described in more detail below with respect to FIG. 4.

In the illustrated configuration, the TAC 206 is shown including the TLB 207 and the PSC 209, each of which stores cache address translation information. It is appreciated, however, that the TLB 207 and the PSC 209 have different functionality. During the lookup of a virtual address, both the TLB 207 and the PSC 209 are searched at about the same time and in a similar manner. A hit within the TLB 207 terminates a tablewalk if initiated, or otherwise may avoid initiating the tablewalk, since the physical address information may be provided directly from the TLB 207. It is noted that a tablewalk may be initiated early even while searching the TLB 207 for timing considerations to improve performance. In one embodiment, for example, the TLB 207 includes a smaller, faster level-1 (L1) TLB that is directly accessible by the processing pipeline, and a second larger, slower level-2 (L2) TLB that is incorporated within the tablewalk engine. When a hit occurs in the L1 TLB, then the information is provided quickly and a tablewalk is entirely avoided. When the virtual address misses in the L1 TLB, then a tablewalk is pushed while the L2 TLB is also searched. If the entire TLB 207 misses, the tablewalk is initiated (if not already initiated), and a hit within the PSC 209 accelerates the tablewalk process since at least a portion of the address translation information is provided directly from the PSC 209 rather than having to access the corresponding page tables in system memory. A miss in both the TLB 207 and the PSC 209 results in a full tablewalk. A miss in the TLB 207 and a hit within the PSC 209 results in an accelerated or partial tablewalk.

The TLB 207 is illustrated in simplified form as a single block. It is understood, however, that the TLB 207 may include a hierarchy of different TLB caches or the like, such as separate TLB caches for data (e.g., dTLB) and instructions (e.g., iTLB), and separate TLB cache levels, such as a first level (L1) including a smaller, faster TLB, and multiple secondary levels that may be larger and somewhat slower (e.g., L2 TLB). In a similar manner, the PSC 209 is illustrated in simplified form as a single block, but represents one or more page table caches supported by the processor 100.

Figure 3:
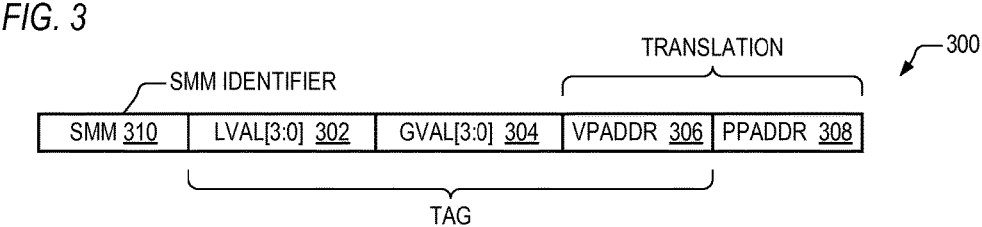
FIG. 3 is a block diagram illustrating an entry in the TLB including a system management mode identifier implemented according to one embodiment.

FIG. 3 is a block diagram illustrating an entry 300 in the TLB 207 including an SMM identifier 310 implemented according to one embodiment. Each TLB entry 300 includes a local valid bit vector (LVAL) 302, a global valid bit vector (GVAL) 304, a virtual page address (VPADDR 306) and a physical page address (PPADDR) 308. In one embodiment, the LVAL 302 comprises four bits and the GVAL 304 comprises four bits. The LVAL 302, GVAL 304 and VPADDR 306 are collectively referred to as the tag of the entry 300. The VPADDR 306 and the PPADDR 308 are collectively referred to as the address translation of the entry 300. Although not shown, preferably the TLB entry 300 also includes permissions bits that specify the permissions associated with the page.

In one embodiment, the mapping module 204 guarantees: (1) every LID is mapped from a unique VPID:EPTP:PCID combination (extended page table feature enabled), VPID:PCID combination (extended page table feature disabled), or PCID (virtual processor identifier feature disabled); (2) every GID is mapped from a unique VPID:EPTP combination (extended page table feature enabled) or VPID (extended page table feature disabled); (3) if a TLB entry 300 is a valid global address translation (e.g., GVAL 304 is non-zero), it is not a valid local address translation (the LVAL 302 is zero); conversely, (4) if a TLB entry 300 is a valid local address translation (e.g., LVAL 302 is non-zero), it is not a valid global address translation (the GVAL 304 is zero). Some advantages of the above guarantees are that the mapping module 204 can: (1) simultaneously invalidate all TLB 207 global address translations; and (2) simultaneously invalidate all TLB 207 local address translations. Furthermore, the mapping module 204 does not guarantee that LIDs are mapped from unique PCIDs. That is, the same PCID value can be specified by multiple virtual processors and therefore be mapped to different LIDs. Similarly, the mapping module 204 may associated multiple LIDs with a given GID. However, the converse is not true, i.e., the mapping module 204 does not associate multiple GIDs with a given LID. However, at some point in the operation of the processor 100, every LID could correspond to a unique GID, e.g., in an embodiment in which the number of GIDs and LIDs is equal (denoted N) and at the point in time there are N virtual processors each having specified a single PCID.

In addition, the SMM identifier 310 is included with each entry 300 of the TLB 207. The SMM identifier 310 indicates whether the corresponding translation is associated with the processor 100 when operating in either SMM or non-SMM. In one embodiment, the SMM identifier 310 includes at least one bit that is set to a first state (e.g., logic "1") to indicate the SMM, and that is reset or cleared to another state (e.g., logic "0") to indicate the non-SMM, such as the normal mode or the like.

Figure 10:
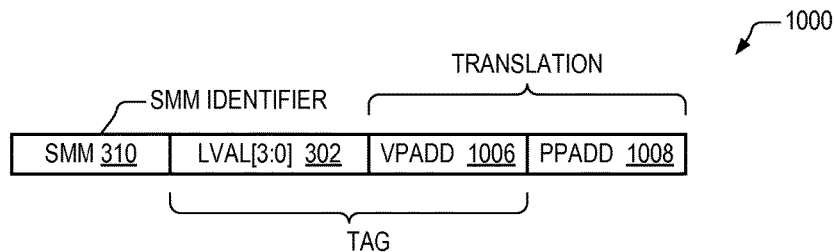
FIG. 10 is a block diagram illustrating an entry in the PSC of FIG. 2 including an SMM identifier implemented according to one embodiment.

FIG. 10 is a block diagram illustrating an entry 1000 in the PSC 209 including an SMM identifier 310 implemented according to one embodiment. Each entry of the PSC 209 includes the SMM identifier 310 and the LVAL 302 in substantially the same manner as the entries of the TLB 207. The global address translation, GVAL, is not included within each entry of the PSC 209. The virtual page address (VPADDR 306) is replaced by a virtual page address VPADD 1006, which includes only a portion of the virtual page address depending upon the particular address translation context being used and upon the particular paging structure cache being implemented. The physical page address (PPADDR) 308 is replaced by a physical address PPADD 1008 that also depends upon the particular paging structure cache being implemented.

As an example, the hierarchy of paging structures for IA-32e paging may include paging tables PML4, PDPT, PD and PT. A separate paging structure cache may be supported by the processor 100 for any one or more of these paging structures to improve performance. Each entry of a paging structure cache for the PDPT table includes a VPADD 1006 value that includes those bits of the virtual address that correspond with the PDPT table, and a PPADD 1008 physical address that points to the base of the next paging table PD. In one embodiment for a virtual address of 48 bits [47:0], VPADD 1006 may include bits [47:30], and PPADD 1008 is a physical address that points to the base of the next table in the paging structure hierarchy, which is the PD table. In this manner, a hit within the PDPT cache avoids searching the PML4 and the PDPT paging structures and allows searching to begin at the PD table to improve performance. In a similar manner, each entry of a paging structure cache for the PD table includes a VPADD 1006 value that includes those bits of the virtual address that correspond with the PD table, and a PPADD 1008 physical address that points to the base of the next paging table PT. Assuming a 48-bit virtual address, VPADD 1006 may include bits [47:21], and PPADD 1008 is a physical address that points to the base of the PT table, which is the next table in the paging structure hierarchy. In this manner, a hit within the PD cache avoids searching the PML4, the PDPT and the PD paging structures and allows searching to begin at the PT table to improve performance.

Figure 4:
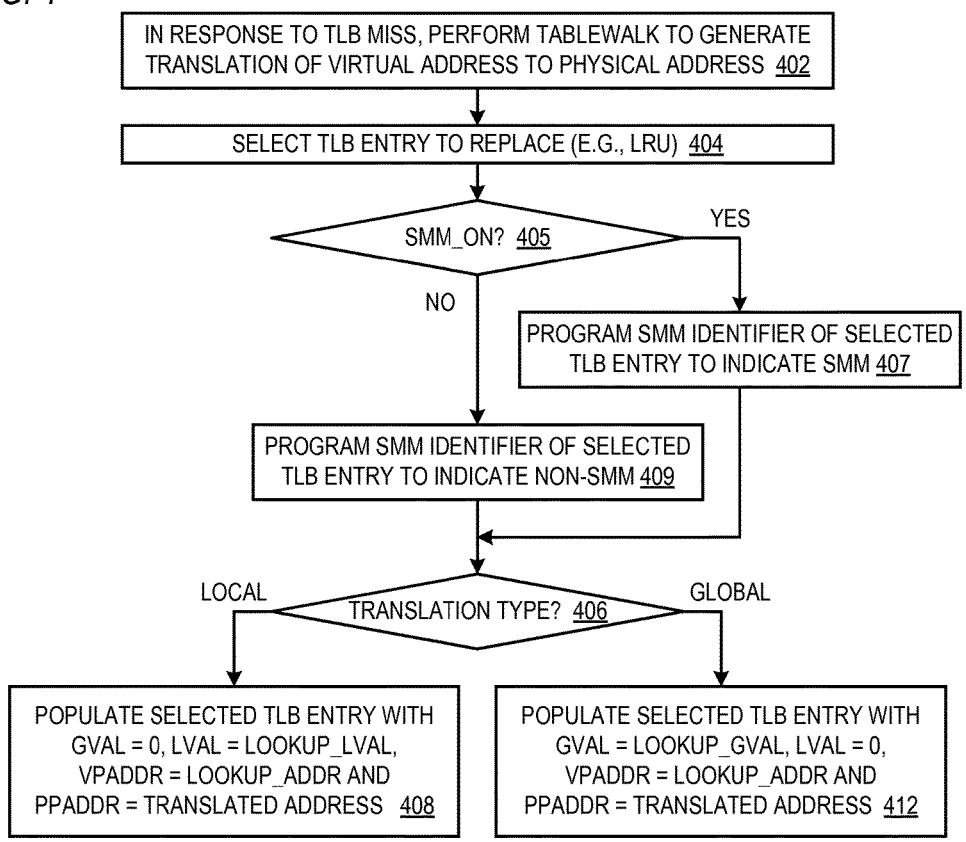
FIG. 4 is a flowchart illustrating operation of the processor of FIG. 1 to populate an entry of the TLB with a corresponding translation according to one embodiment.

FIG. 4 is a flowchart diagram illustrating operation of the processor 100 of FIG. 1 to populate an entry 300 of the TLB 207 with a corresponding translation according to one embodiment. Flow begins at block 402.

At block 402, the memory subsystem 122 detects a miss of a LOOKUP_ADDR 276 in the TLB 207 and performs a tablewalk to generate an address translation. That is, the memory subsystem 122 uses the current address translation context to translate the missing LOOKUP_ADDR 276 into a physical address. The memory subsystem 122 may include a tablewalk engine (not shown) that performs the tablewalk. The tablewalk may include a portion that uses legacy paging structures (e.g., x86 ISA page descriptor base address, page descriptor tables and page table entries) as well as extended page tables associated with virtual machine capabilities of the processor 100 (e.g., x86 ISA Virtual Machine eXtensions (VMX) extended page table pointers (EPTP) and extended page tables (EPTs)). Flow proceeds to block 404.

At block 404, the memory subsystem 122 selects an entry 300 in the TLB 207 storing a corresponding address translation to replace. In one embodiment, the TLB 207 is a set-associative cache, and each set of the TLB 207 include replacement information, such as least recently used (LRU) or pseudo-LRU information, and the memory subsystem 122 selects for replacement the entry 300 of the indexed set indicated by the replacement information. Flow proceeds to decision block 405.

At decision block 405, the memory subsystem 122 queries the SMM_ON value 130 to determine whether the processor 100 is operating in SMM. If the SMM_ON value 130 is true indicating SMM, then flow proceeds to block 407; otherwise, the processor 100 in not in SMM (non-SMM) so that flow proceeds to block 409.

At block 407, the SMM identifier 310 of the selected TLB entry 300 is programmed to indicate SMM in which the translation being stored is associated with SMM. Flow proceeds to decision block 406 from block 407.

At block 409, the SMM identifier 310 of the selected TLB entry 300 is programmed to indicate the non-SMM operating mode in which the translation being stored is not associated with SMM. Flow proceeds to decision block 406 from block 409.

At decision block 406, the memory subsystem 122 determines whether the address translation is a global translation or a local translation. The memory subsystem 122 may make the determination based on information in the current address translation context when performing the tablewalk at block 402. If global, flow proceeds to block 412; otherwise, flow proceeds to block 408.

At block 408, the memory subsystem 122 populates the TLB entry 300 selected at block 404 with a GVAL 304 of zero because the address translation is a local address translation, an LVAL 302 equal to the LOOKUP_LVAL 272 (which is a representation of the CUR_LID 242), a VPADDR 306 equal to the missing LOOKUP_ADDR 276, and a PPADDR 308 equal to the translated address, i.e., the physical address generated by the tablewalk at block 402. Flow ends at block 408.

At block 412, the memory subsystem 122 populates the TLB entry 300 selected at block 404 with a GVAL 304 equal to the LOOKUP_GVAL 274 (which is a representation of the CUR_GID 244), an LVAL 302 of zero because the address translation is a global address translation, a VPADDR 306 equal to the missing LOOKUP_ADDR 276, and a PPADDR 308 equal to the translated address, i.e., the physical address generated by the tablewalk at block 402. Flow ends at block 412.

Figure 11:
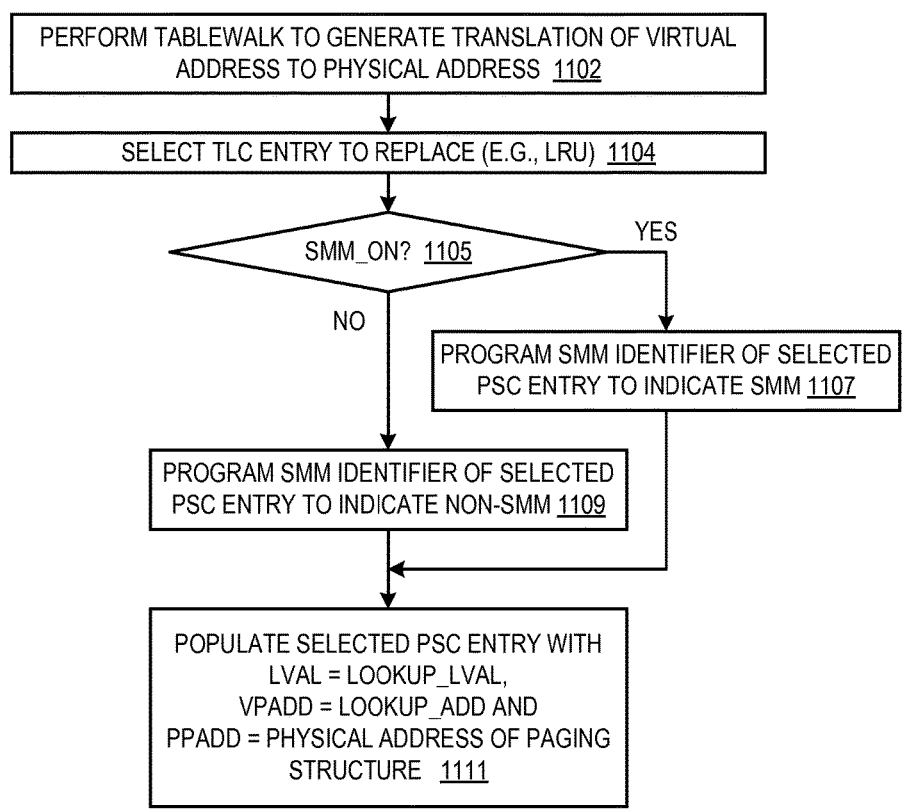
FIG. 11 is a flowchart diagram illustrating operation of the processor 100 of FIG. 1 to populate an entry of a paging structure cache of the PSC of FIG. 2 with a corresponding translation according to one embodiment.

FIG. 11 is a flowchart diagram illustrating operation of the processor 100 of FIG. 1 to populate an entry 1000 of a paging structure cache of the PSC 209 with a corresponding translation according to one embodiment. The process for programming the SMM identifier 310 of each entry of the PSC 209 is substantially similar to that of the TLB 207. The SMM identifier 310 of the entry is programmed to match the SMM_ON value 130 so that each entry is programmed to reflect the proper SMM context. This process may be performed for each paging structure cache that is implemented. Alternatively, multiple paging structure caches may be updated at the same time.

Flow begins at block 1102, in which a tablewalk has been performed to determine the physical address in a similar manner as previously described. At block 1104, the memory subsystem 122 selects an entry 1000 of the paging structure cache in the PSC 209 storing a corresponding address translation to replace. An LRU or other replacement policy may be used. At next block 1105, the memory subsystem 122 queries the SMM_ON value 130 to determine whether the processor 100 is operating in SMM. If the SMM_ON value 130 is true indicating SMM, then flow proceeds to block 1107; otherwise, the processor 100 in not in SMM (non-SMM) so that flow proceeds to block 1109. At block 1107, the SMM identifier 310 of the selected PSC entry 1000 is programmed to indicate SMM in which the translation being stored is associated with SMM. Alternatively, At block 1109, the SMM identifier 310 of the selected PSC entry 1000 is programmed to indicate the non-SMM operating mode in which the translation being stored is not associated with SMM. Flow proceeds to decision block 1111 from either block 1107 or 1109.

At block 1111, the memory subsystem 122 populates the PSC entry 1000 selected at block 1104 with an LVAL 302 equal to the LOOKUP_LVAL 272 (which is a representation of the CUR_LID 242). The memory subsystem 122 populates VPADD 1006 with the corresponding upper bits of the virtual address, and populates PPADD 1008 with the physical address pointing to the base of the next paging structure in the hierarchy. The upper bits of the virtual address used for VPADD 1006 and the physical address used for the PPADD 1008 depend upon the particular paging structure cache as previously described. Flow ends at block 1111.

FIG. 5 is a block diagram illustrating hit logic 500 implemented according to one embodiment within the TAC 206 for determining whether a hit 224 occurred in response to an address lookup for the TLB 207. The hit logic 500 is substantially similar for the PSC 209, so that the description of FIG. 5 generally applies to either cache type of the TAC 206. References to entries 300 of the TLB 207 apply in substantially similar manner to entries 1000 of the PSC 209. The entries 1000 of the PSC 209, however, do not include GVAL, so that the GVAL comparisons are not included or otherwise not used for the comparisons for the PSC 209. Also, the comparisons of VPADD for the PSC 209 are similar to the VPADDR comparisons for the TLB 207, except that only the applicable number of bits are compared depending upon the particular paging cache structure being implemented. The hit logic 500 shown (except for an OR function 534) corresponds to a single entry 300 of the TLB 207 to determine whether a hit 524 was generated for that entry 300. However, it should be understood that for a fully associative embodiment, the hit logic 500 exists within the TAC 206 for every entry of the TLB 207 and the PSC 209, but is not shown for simplicity and clarity, and for a set-associative embodiment, the logic 500 exists per way. The hit indicator 524 of all of the entries of the TLB 207 are Boolean OR-ed by OR function 534 to generate the TLB 207 hit indicator 224 of FIG. 1. It should be understood that the various Boolean functions shown in the Figures may correspond to Boolean gates (e.g., AND gates, OR gates, Exclusive-OR (XOR) gates, Exclusive-NOR (XNOR) gates, etc.), which may be synthesized or custom designed; however, the hit logic 500 may comprise other hardware elements known to perform the Boolean functions shown, e.g., wired-OR, and may be implemented in various logic types, including static or dynamic logic. Advantageously, the embodiments described enable simultaneous invalidation of local and/or global address translations of the TAC 206 regardless of the underlying process technology or logic types.

The hit logic 500 includes a first comparison function 522 of the LOOKUP_LVAL 272 and the LVAL 302 of the entry 300 whose output is provided as a first of two inputs to a Boolean OR function 528. The hit logic 500 also includes a second comparison function 524 of the LOOKUP_GVAL 274 and the GVAL 304 of the entry 300 whose output is provided as the second input to Boolean OR function 528. The output of Boolean OR function 528 is provided as a first of three inputs to a Boolean AND function 532. The hit logic 500 includes a third comparison function 526 of the LOOKUP_ADDR 276 and the VPADDR 306 of the entry 300 whose output is provided as the second input to Boolean AND function 532. The hit logic 500 includes a Boolean Exclusive-NOR (XNOR) function 536 having a first input receiving the SMM_ON value 130, a second input receiving the SMM identifier 310 of each entry 300, and an output provided as the third input to the Boolean AND function 532.

The output of Boolean AND function 532 is hit indicator 524 that is true if the LOOKUP_LVAL 272 matches the LVAL 302 or the LOOKUP_GVAL 274 matches the GVAL 304, and if the LOOKUP_ADDR 276 matches the VPADDR 306, and if the SMM identifier 310 of the entry 300 matches the SMM_ON value 130. Otherwise, the hit indicator 524 is false. The XNOR function 536 ensures that a hit occurs only when an SMM translation matches the lookup address in SMM, or when a non-SMM translation matches the lookup address in non-SMM. Thus, a non-SMM translation will not hit while in the SMM, and an SMM translation will not hit while not in SMM.

As may be observed from FIG. 5, each local address translation within the TLB 207 is identified by its respective LVAL 302, which is a representation of its local context identifier; and each global address translation is identified by its respective GVAL 304, which is a representation of its global context identifier. The LOOKUP_LVAL 272 and the LOOKUP_GVAL 274 are included in the TLB 207 lookup. However, along with a match of the LOOKUP_ADDR 276 and VPADDR 306, only either the LOOKUP_LVAL 272 need match the LVAL 302 or the LOOKUP_GVAL 274 need match the GVAL 304, but not both, i.e., not the entire tag, in order for a hit to occur. Thus, as may be observed from the operation described with respect to FIGS. 4 and 5, in order to use an address translation from the TLB 207, the address translation context used to translate the PPADDR 308 from the VPADDR 306 must be the address translation context associated with the CUR_LID 242 or one of multiple address translation contexts associated with the CUR_GID 244. Furthermore, the SMM context must match.

FIG. 6 is a block diagram illustrating flush logic 600 used to invalidate a bit of the LVAL bit vector 302 of an entry 300 of the TLB 207 of FIG. 2 according to one embodiment. Again, references to entries 300 apply in similar manner to entries 1000 of the PSC 209. FIG. 6 shows a single bit of the LVAL bit vector 302. The storage for the bit may be a flip-flop, a memory array bit cell, or other bit storage device. A Boolean invert (NOT) function 604 receives the bit of the INV_LOCAL bit vector 232 that corresponds to the bit of the LVAL bit vector 302. For example, bit [2] of the INV_LOCAL bit vector 232 is received by the invert function 604 for bit [2] of the LVAL bit vector 302. The output of the invert function 604 is provided to one of three inputs to a Boolean AND function 606. A second input of the Boolean AND function 606 receives the current value of the LVAL bit vector 302. A Boolean XNOR function 602 receives the SMM_ON value 130 and the SMM identifier 310 of the entry 300, and the output of the Boolean XNOR function 602 is provided to a third input of the Boolean AND function 606. The output of the Boolean AND function 606 is clocked in as the new value of the LVAL bit vector 302. Thus, the mapping module 204 is able to clear any bit of the LVAL bit vector 302 by setting the corresponding bit of the INV_LOCAL bit vector 232. Although FIG. 6 shows the flush logic 600 for a single bit, the flush logic 600 is replicated within the TAC 206 for each bit of the LVAL bit vector 302 for each entry 300 of the TLB 207 and for each entry 1000 of the PSC 209.

The XNOR function 602 ensures that the output of the AND function 606 is true (or asserted to logic "1") only when the flush operation is performed within the same SMM context. In one embodiment, the output of the XNOR function 602 is true only when the SMM_ON value 130 indicating the operating mode of the processor 100 matches the SMM identifier 310 of the corresponding entry 300 or 1000 of the TAC 206.

Advantageously, by setting a bit of the INV_LOCAL bit vector 232, the mapping module 204 clears the corresponding bit of the LVAL bit vector 302 for every entry 300 of the TLB 207 within the same SMM context. Since each bit position of the LVAL 302 is the valid bit for all the local address translations for a respective address translation context, the flush logic 600 enables the mapping module 204 to simultaneously invalidate all the local address translations in the TLB 207 for the respective address translation context for either SMM or non-SMM. This is advantageous because it is faster than sequentially invalidating the local address translations in the TLB 207 for the respective address translation context. Indeed, as the size of the TLB 207 grows (e.g., for a large last-level TLB 207), the time saved may become more significant.

FIG. 7 is a block diagram illustrating flush logic 700 used to invalidate a bit of the GVAL bit vector 304 of an entry 300 of the TLB 207 of FIG. 2 according to one embodiment. In this manner, the TLB 207 includes similar flush logic 700 for each bit of the GVAL bit vector 304 for each entry 300 of the TLB 207, although the flush logic 700 receives the corresponding bit of the INV_GLOBAL bit vector 234 rather than the INV_LOCAL bit vector 232. The flush logic 700 is not necessary for the PSC 209 since GVAL is not included. In a similar manner as the flush logic 600, the flush logic 700 includes a Boolean invert function 704 receiving a corresponding bit of the INV_GLOBAL bit vector 234, a Boolean XNOR function 702 receiving the SMM_ON value 130 and the SMM identifier 310 of the entry 300, a Boolean AND function 706 receiving the output of the Boolean invert function 704, the output of the Boolean XNOR function 702, and the current value of the GVAL bit vector 304. The flush logic 700 clocks in the new value of the GVAL bit vector 304.

Although FIG. 7 shows the flush logic 700 for a single bit, the flush logic 700 is replicated within the TLB 207 for each bit of the GVAL bit vector 304 for each entry 300 of the TLB 207. Advantageously, by setting a bit of the INV_GLOBAL bit vector 234, the mapping module 204 clears the corresponding bit of the GVAL bit vector 304 for every entry 300 of the TLB 207 within the same SMM context. Since each bit position of the GVAL 304 is the valid bit for all the global address translations for a respective address translation context, the flush logic 700 enables the mapping module 204 to simultaneously invalidate all the global address translations in the TLB 207 for the respective address translation and within the same SMM context. This is beneficial because it is faster than sequentially invalidating the global address translations in the TLB 207 for the respective address translation context. Indeed, as the size of the TLB 207 grows (e.g., for a large last-level TLB 207), the time saved may become more significant.

Although not shown, the flush logic 600 and 700 may include other functions for each bit of the LVAL/GVAL bit vector 302/304 to set or clear the bit.

It should be noted that, if desired, bits of the LVAL 302 and GVAL 304 can be cleared simultaneously by setting bits in the INV_LOCAL bit vector 232 and INV_GLOBAL bit vector 234, respectively, for either SMM or non-SMM processing mode. Also, if desired, all the bits of the LVAL 302 and/or GVAL 304 can be cleared simultaneously by setting all bits in the INV_LOCAL bit vector 232 and/or INV_GLOBAL bit vector 234, respectively, for either SMM or non-SMM. The inclusion of the Boolean XNOR functions 602 and 702 ensure that only those translations corresponding with either SMM or the non-SMM are flushed.

Figure 8:
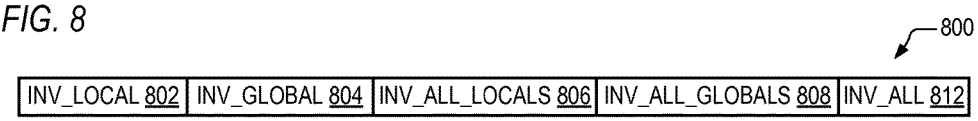
FIG. 8 is a block diagram illustrating a flush control register of the processor of FIG. 1.

FIG. 8 is a block diagram illustrating a flush control register 800 of the processor 100 of FIG. 1. In one embodiment, the flush control register 800 may be written by the microcode 132 in order to invalidate TAC 206 address translations. This mechanism may be used, for example for flushing translation entries associated with SMM in either or both of the SMM entry routine 134 and the SMM exit routine 136 as further described herein. The flush control register 800 includes a INV_LOCAL bit 802, INV_GLOBAL bit 804, INV_ALL_LOCALS bit 806, INV_ALL_GLOBALS bit 808, and INV_ALL bit 812. The operation of the mapping module 204 in response to the setting of these bits is now described with respect to FIG. 9.

Figure 9:
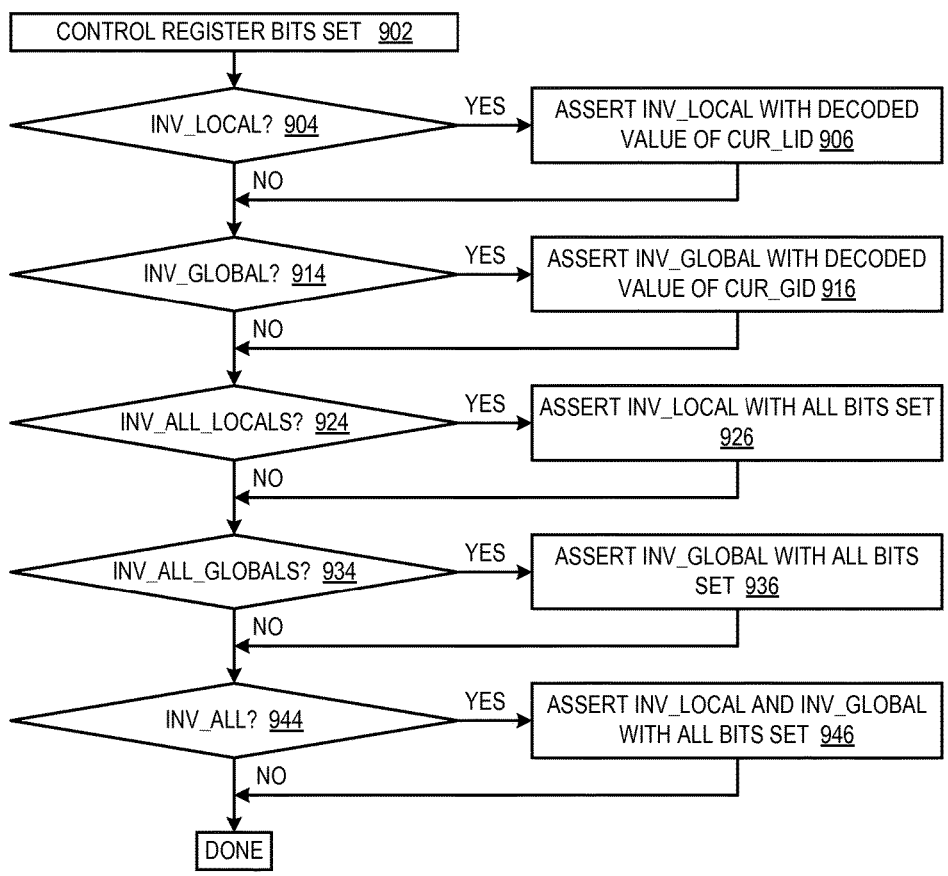
FIG. 9 is a flowchart illustrating operation of the mapping module in response to the setting of the various bits of the control register of FIG. 8.

Referring now to FIG. 9, a flowchart illustrating operation of the mapping module 204 in response to the setting of the various bits of the flush control register 800 of FIG. 8 is shown. The flowchart of FIG. 9 applies to both the TLB 207 and the PSC 209 of the TAC 206 even though the entries 1000 of the PSC 209 do not include global values. The microcode ensures that when an INV_GLOBAL bit is set, INV_LOCAL is also set. Likewise, when INV_ALL_GLOBALS is set, then INV_ALL_LOCALS is also set. In this manner, the appropriate entries of both the TLB 207 and the PSC 209 are flushed in response to setting of bits of the flush control register 800. Flow begins at block 902.

At block 902, one or more bits of the flush control register 800 are set, e.g., by microcode 106. Flow proceeds to decision block 904.

At decision block 904, if the INV_LOCAL bit 902 is set, flow proceeds to block 906; otherwise, flow proceeds to decision block 914.

At block 906, the mapping module 204 decodes the CUR_LID 242 to generate a one-hot bit vector value and asserts the value on the INV_LOCAL bit vector 232, which clears, for every entry 300 or 1000 of the TAC 206, the bit of the LVAL 302 corresponding to the one set bit in the INV_LOCAL bit vector 232, which invalidates all local address translations in the TAC 206 translated using the current address translation context and within the same SMM context. Flow proceeds to decision block 914.

At decision block 914, if the INV_GLOBAL bit 804 is set, flow proceeds to block 916; otherwise, flow proceeds to decision block 924.

At block 916, the mapping module 204 decodes the CUR_GID 244 to generate a one-hot bit vector value and asserts the value on the INV_GLOBAL bit vector 234, which clears, for every entry 300 of the TLB 207, the bit of the GVAL 304 corresponding to the one set bit in the INV_GLOBAL bit vector 234, which invalidates all global address translations in the TLB 207 translated using the current address translation context and within the same SMM context. Flow proceeds to decision block 924.

At decision block 924, if the INV_ALL_LOCALS bit 806 is set, flow proceeds to block 926; otherwise, flow proceeds to decision block 934.

At block 926, the mapping module 204 asserts all bits of the INV_LOCAL bit vector 232, which clears, for every entry 300 or 1000 of the TAC 206, all bits of the LVAL 302, which invalidates all local address translations in the TAC 206 translated using any address translation context and within the same SMM context. Flow proceeds to decision block 934.

At decision block 934, if the INV_ALL_GLOBALS bit 808 is set, flow proceeds to block 936; otherwise, flow proceeds to decision block 944.

At block 936, the mapping module 204 asserts all bits of the INV_GLOBAL bit vector 234, which clears, for every entry 300 of the TLB 207, all bits of the GVAL 304, which invalidates all global address translations in the TLB 207 translated using any address translation context and within the same SMM context. Flow proceeds to decision block 944.

At decision block 944, if the INV_ALL bit 812 is set, flow proceeds to block 946; otherwise, flow ends.

At block 946, the mapping module 204 asserts all bits of the INV_LOCAL bit vector 232 and all bits of the INV_GLOBAL bit vector 234, which clears, for every entry 300 or 1000 of the TAC 206, all bits of the LVAL 302 and all bits of the GVAL 304 (TLB 207 only), which invalidates all address translations in the TAC 206 translated using any address translation context and within the same SMM context. Flow ends at block 946.

In summary, FIG. 1 illustrates that the processor 100 operates in either system management mode (SMM) or non-SMM mode based on the programmed SMM_ON value 130 in the state control register 128. FIG. 3 illustrates that each entry 300 or 1000 of the TAC 206 includes an SMM identifier 310. FIG. 4 illustrates that the SMM identifier 310 of each new address translation is programmed to indicate whether the new translation entry belongs to the non-SMM address translation context or to the SMM address translation context. FIG. 5 illustrates that each address lookup produces a hit only when the SMM context is the same, that is, when the SMM identifier 310 of the translation entry matches the current value of the SMM_ON value 130. In this manner, false hits caused by address translation matches during non-SMM operation with an SMM context translation are avoided; likewise, false hits caused by address translation matches during SMM operation with a non-SMM context translation are avoided.

In this manner, it is appreciated that SMM and non-SMM translations may coexist within the TAC 206 without conflicts that might otherwise cause false hits and erroneous operation. Thus, valuable non-SMM cached address translations in the TAC 206 need not be flushed when entering or exiting SMM operation. When non-SMM operation is resumed, many, if not all, of the valuable cached address translations remain stored in the TAC 206 thereby avoiding excessive tablewalks that would otherwise be necessary to access the system memory. The retention of valuable non-SMM cached address translations stored in a translation address cache of a processor (such as the TLB 207 and/or the PSC 209 of the processor 100) improves operation performance and efficiency.

As described herein, however, the address translation context is usually different from one SMM session to the next. As shown by FIGS. 6 and 7, the flush logic is configured to take into account the SMM context and only flush those entries specific to the operating mode. Thus, for example, non-SMM translation entries are not flushed and remain stored in the TAC 206 when SMM translation entries are flushed upon entering and/or exiting SMM operation. As shown in FIG. 1, the SMM entry routine 134 first programs the SMM_ON value 130 to indicate SMM, and then flushes SMM translations stored in the TAC 206. In addition or instead, the SMM exit routine 136 first flushes SMM translations stored in the TAC 206 while the SMM_ON value 130 still indicates SMM, and then re-programs the SMM_ON value 130 to indicate non-SMM operation. For example, an SMM_ON bit is set for SMM operation and reset or cleared for non-SMM operation. Both operations may be performed to ensure that false hits are avoided.

In a conventional configuration, the SMM address translations stored in the TAC 206 may be individually searched and invalided for each flush operation. FIGS. 8 and 9, in combination with the flush logic shown in FIGS. 6 and 7, however, illustrate a particularly advantageous manner of TAC flushing. Once the SMM_ON value 130 is set to indicate SMM, the SMM translations may be flushed by the SMM entry routine 134 simply by setting the INV_ALL bit 812. Alternatively, or in addition, the SMM exit routine 136 flushes the SMM translations simply by setting the INV_ALL bit 812 while the SMM_ON value 130 indicates SMM. The XNOR logic (or other suitable logic) of the flush logic 600 and 700 ensures that only those entries 300 of the TAC 206 with a matching SMM identifier 310 are invalidated. In this manner, the non-SMM translation entries are not flushed or invalidated and remain in the TAC 206 during SMM operation (unless otherwise replaced by SMM address translations during SMM).

It is noted that it may be advantageous to flush translation entries in the TAC 206 regardless of the SMM context. For example, it may be desired to reset or clear the entire TAC 206 during normal operation. The flush logic 600 and 700 are shown in simplified form and may be modified to enable invalidation regardless of the SMM context simply by adding logic to bypass the XNOR logic 602 and/or 702. For example, a universal flush enable bit (not shown) may be set and Boolean OR'd with the outputs of each of the XNOR logic 602 and/or 702, so that the universal flush enable bit could be used to bypass the SMM context for invalidating TAC entries 300 regardless of the value of the SMM_ON value 130 or the SMM identifier 310.

Although embodiments have been described in which the size of the local (and global) context identifier space is a predetermined size (e.g., four), other embodiments are contemplated in which the size of the local (and global) context identifier space is different according to the desired design goals such as performance, size and power consumption. Additionally, although embodiments have been described with respect to a single TLB and/or a single PSC, it should be understand that the mechanisms described can be employed for each TLB or PSC in a processor having multiple TACs. Furthermore, although embodiments are described in which bits appear to have a particular meaning of set or clear or zero or one, it should be understood that positive-logic and negative-logic implementations may be employed. Finally, although various embodiments are described with respect to the x86 ISA, the mechanisms for mapping a large architectural address translation context space to a smaller non-architectural address translation context space and for simultaneously invaliding address translations described herein may be employed in other ISAs, such as the ARM, MIPS or Sun ISAs.

While various embodiments of the present invention have been described herein, it should be understood that they have been presented by way of example, and not limitation. It will be apparent to persons skilled in the relevant computer arts that various changes in form and detail can be made therein without departing from the scope of the invention. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A processor, comprising:
    a memory that stores a system management mode value indicative of whether the processor is in a system management mode;
    a translation address cache comprising a plurality of entries for storing address translations, wherein each of said plurality of entries includes a system management mode identifier;
    hit logic that compares a lookup address with address translations stored in said plurality of entries of said translation address cache for determining a hit, wherein said hit logic determines a hit only when a corresponding system management mode identifier of an entry matches said system management mode value;
    entry logic that selects one of said plurality of entries of said translation address cache for storing a determined address translation and that programs a system management mode identifier of the selected entry of said translation address cache to match said system management mode value; and
    flush logic that flushes only those address translations stored in said translation address cache that have a corresponding system management mode identifier matching said system management mode value in response to at least one of entering said system management mode or exiting said system management mode.

2. The processor of claim 1, further comprising processing logic that commands flushing of address translations stored in said translation address cache having a corresponding system management mode identifier indicating said system management mode in response to entering said system management mode.

3. The processor of claim 1, further comprising processing logic that commands flushing of address translations stored in said translation address cache having a corresponding system management mode identifier indicating said system management mode in response to exiting said system management mode.

4. The processor of claim 1, wherein said flush logic flushes only those address translations stored in said translation address cache that have a corresponding system management mode identifier matching said system management mode value in response to a flush command.

5. The processor of claim 4, further comprising processing logic that sets said system management mode value to indicate said system management mode in response to a system management mode interrupt, and then that issues said flush command.

6. The processor of claim 4, further comprising processing logic that issues said flush command in response to exiting said system management mode, and then that clears said system management mode value.

7. The processor of claim 4, further comprising:
    first processing logic operative to:
    set said system management mode value to indicate said system management mode in response to a system management mode interrupt;
    issue said flush command; and
    transfer control to a handler routine; and
    second processing logic operative to:
    issue said flush command in response to exiting said handler routine;
    clear said system management mode value; and
    return operation back to a normal operating mode.

8. The processor of claim 1, wherein said translation address cache comprises a translation-lookaside buffer.

9. The processor of claim 1, wherein said translation address cache comprises a paging structure cache.

10. A method capable of operating a processor to distinguish system management mode entries in a translation address cache, comprising:
    storing a system management mode value indicative of whether the processor is in the system management mode;
    providing a system management mode identifier for each of a plurality of entries of the translation address cache for storing address translations;
    determining a hit in the translation address cache only when a corresponding system management mode identifier of an entry matches the system management mode value when applying a lookup address to the translation address cache to find a matching address;
    programming the system management mode identifier of a selected one of the plurality of entries of the translation address cache to match the system management mode value in the event of a miss in the translation address cache, and storing a determined address translation in the selected entry; and
    flushing only those address translations stored in said translation address cache that have a corresponding system management mode identifier matching the system management mode value upon at least one of entering the system management mode or returning from the system management mode.

11. The method of claim 10, further comprising commanding flushing of address translations stored in the translation address cache having a corresponding system management mode identifier that indicates the system management mode in response to entering the system management mode.

12. The method of claim 10, further comprising commanding flushing of address translations stored in the translation address cache having a corresponding system management mode identifier indicating the system management mode of operation in response to a return from the system management mode.

13. The method of claim 10, further comprising:
commanding flushing of address translations stored in the translation address cache having a corresponding system management mode identifier that indicates the system management mode in response to entering the system management mode; and
commanding flushing of address translations stored in the translation address cache having a corresponding system management mode identifier indicating the system management mode of operation in response to a return from the system management mode.

14. The method of claim 10, further comprising flushing only those address translations stored in said translation address cache that have a corresponding system management mode identifier matching the system management mode value in response to a flush command.

15. The method of claim 14, further comprising setting the system management mode value to indicate the system management mode in response to a system management mode interrupt, and then providing the flush command.

16. The method of claim 14, further comprising providing the flush command in response to a return from the system management mode, and then clearing the system management mode value.

17. The method of claim 14, further comprising:
in response to receiving a system management mode interrupt:
setting the system management mode value to indicate the system management mode;
providing the flush command; and
transferring control to a handler routine: and in response to a return from the handler routine:
providing the flush command;
clearing the system management mode value; and transferring operation back to a normal operating mode.

18. A computer program product encoded in at least one non-transitory computer usable medium for use with a computing device, the computer program product comprising:
computer usable program code embodied in said medium, for specifying a processor, the computer usable program code comprising:
first program code for specifying a memory that stores a system management mode value indicative of whether the processor is in a system management mode;
second program code for specifying a translation address cache comprising a plurality of entries for storing address translations, wherein each of said plurality of entries includes a system management mode identifier;
third program code for specifying hit logic that compares a lookup address with address translations stored in said plurality of entries of said translation address cache for determining a hit, wherein said hit logic determines a hit only when a corresponding system management mode identifier of an entry matches said system management mode value; fourth program code for specifying entry logic that selects one of said plurality of entries of said translation address cache for storing a determined address translation and that programs a system management mode identifier of said selected entry of said translation address cache to match said system management mode value; and
fifth program code for specifying processing logic that commands flushing of address translations stored in said translation address cache having a corresponding system management mode identifier indicating said system management mode in response to at least one of a system management mode interrupt or exiting said system management mode.

19. The computer program product of claim 18, wherein said fifth program code specifies processing logic that commands flushing of address translations stored in said translation address cache having a corresponding system management mode identifier indicating said system management mode in response to a system management mode interrupt.

20. The computer program product of claim 18, wherein said fifth program code specifies processing logic that commands flushing of address translations stored in said translation address cache having a corresponding system management mode identifier indicating said system management mode in response to exiting said system management mode.

21. The computer program product of claim 18, wherein said fifth program code specifies flush logic that flushes only those address translations stored in said translation address cache that have a corresponding system management mode identifier matching said system management mode value in response to a flush command.

22. The computer program product of claim 21, further comprising:
sixth program code for specifying processing logic that sets said system management mode value to indicate said system management mode in response to a system management mode interrupt, and then that issues said flush command; and
seventh program code for specifying processing logic that issues said flush command in response to exiting said system management mode, and then that clears said system management mode value.

23. The computer program product of claim 18, wherein said second program code specifies a translation-lookaside buffer.

24. The computer program product of claim 18, wherein said second program code specifies a paging structure cache.

* * * * *